(12) United States Patent
Wang et al.

(10) Patent No.: US 12,260,264 B2
(45) Date of Patent: Mar. 25, 2025

(54) EDGE SERVICE PROVIDING METHOD AND APPARATUS, AND DEVICE BY UTILIZING RESOURCES BASED ON GEOGRAPHICAL COVERAGE

(71) Applicant: Huawei Cloud Computing Technologies Co., Ltd., Gui'an (CN)

(72) Inventors: Nannan Wang, Shenzhen (CN); Zilin Wu, Shenzhen (CN); Sen Zhang, Shenzhen (CN)

(73) Assignee: Huawei Cloud Computing Technologies Co., Ltd., Gui'an (CN)

( * ) Notice: Subject to any disclaimer, the term of this patent is extended or adjusted under 35 U.S.C. 154(b) by 493 days.

(21) Appl. No.: 17/552,125

(22) Filed: Dec. 15, 2021

(65) Prior Publication Data

US 2022/0107848 A1  Apr. 7, 2022

Related U.S. Application Data

(63) Continuation of application No. PCT/CN2020/077619, filed on Mar. 3, 2020.

(30) Foreign Application Priority Data

Jun. 15, 2019  (CN) .......................... 201910518418.4

(51) Int. Cl.
*G06F 9/50* (2006.01)
*H04L 41/0823* (2022.01)
(Continued)

(52) U.S. Cl.
CPC ............ *G06F 9/5083* (2013.01); *G06F 9/505* (2013.01); *G06F 9/5072* (2013.01);
(Continued)

(58) Field of Classification Search
None
See application file for complete search history.

(56) References Cited

U.S. PATENT DOCUMENTS 8,539,079 B2    9/2013  Thireault
10,567,347 B2 *  2/2020  Sawant ............... G06F 9/45558
(Continued)

FOREIGN PATENT DOCUMENTS

CN    101136932 A    3/2008
CN    101170452 A    4/2008
(Continued)

OTHER PUBLICATIONS

B. Niven-Jenkins et al., "Request Routing Redirection Interface for Content Delivery Network (CDN) Interconnection," Request for Comments: 7975, Internet Engineering Task Force (IETF), total 35 pages (Oct. 2016).

(Continued)

*Primary Examiner* — Abu Zar Ghaffari
(74) *Attorney, Agent, or Firm* — Leydig, Voit & Mayer, Ltd.

(57) ABSTRACT

This application relates to the field of cloud computing, and specifically, to a method for providing an edge service for a terminal by using a resource of an edge resource cluster in a cloud computing system. The cloud computing system includes a central resource cluster and at least one edge resource cluster. The method includes: a management node deployed in the central resource cluster determines a target execution node based on an edge service application range that is specified by a tenant or that is determined by the management node based on information about a tenant; the target execution node determines, according to an edge service policy sent by the management node, a target edge node from at least one edge node deployed in the at least one (Continued)

edge resource cluster; and the target execution node further forwards an edge service request to the target edge node.

18 Claims, 9 Drawing Sheets

(51) Int. Cl.
  *H04L 41/0894* (2022.01)
  *H04L 67/1004* (2022.01)
  *H04L 67/1021* (2022.01)
  *H04L 41/40* (2022.01)
  *H04L 41/50* (2022.01)
  *H04L 41/5041* (2022.01)

(52) U.S. Cl.
  CPC ........ *G06F 9/5077* (2013.01); *H04L 41/0823* (2013.01); *H04L 41/0894* (2022.05); *H04L 67/1004* (2013.01); *H04L 67/1021* (2013.01); *G06F 2209/5021* (2013.01); *G06F 2209/505* (2013.01); *H04L 41/40* (2022.05); *H04L 41/5041* (2013.01); *H04L 41/5096* (2013.01)

(56) References Cited

U.S. PATENT DOCUMENTS

| | | | |
|---|---|---|---|
| 10,721,295 B2 * | 7/2020 | Enguehard | H04L 67/101 |
| 10,768,920 B2 * | 9/2020 | Fontoura | G06F 8/65 |
| 10,791,168 B1 * | 9/2020 | Dilley | H04L 67/288 |
| 11,943,105 B2 * | 3/2024 | Chen | H04L 67/10 |
| 2013/0110984 A1 | 5/2013 | Raciborski et al. | |
| 2013/0311551 A1 | 11/2013 | Thibeault | |
| 2014/0089500 A1 * | 3/2014 | Sankar | H04L 47/125 709/224 |
| 2014/0189006 A1 * | 7/2014 | Ting | H04L 67/1085 709/204 |
| 2015/0188823 A1 * | 7/2015 | Williams | H04L 12/4633 370/235 |
| 2016/0373547 A1 | 12/2016 | Phillips et al. | |
| 2017/0208138 A1 * | 7/2017 | Baxter | H04L 41/5051 |
| 2017/0317954 A1 * | 11/2017 | Masurekar | H04L 41/0894 |
| 2018/0041425 A1 * | 2/2018 | Zhang | H04L 45/74 |
| 2018/0225137 A1 | 8/2018 | Bianchini et al. | |
| 2018/0307522 A1 * | 10/2018 | Wu | H04L 41/0895 |
| 2019/0042319 A1 * | 2/2019 | Sood | G06F 21/74 |
| 2019/0138290 A1 * | 5/2019 | Garvey | G06N 20/00 |
| 2019/0208009 A1 * | 7/2019 | Prabhakaran | H04L 67/51 |
| 2019/0213104 A1 * | 7/2019 | Qadri | H04L 67/1097 |
| 2020/0192344 A1 * | 6/2020 | O'Connor | H04L 67/30 |
| 2021/0092188 A1 * | 3/2021 | Guo | H04L 67/34 |

FOREIGN PATENT DOCUMENTS

| | | |
|---|---|---|
| CN | 103297507 A | 9/2013 |
| CN | 105763628 A | 7/2016 |
| CN | 106911762 A | 6/2017 |
| CN | 107801086 A | 3/2018 |
| CN | 108156267 A | 6/2018 |
| CN | 109067828 A | 12/2018 |
| CN | 104660700 B | 2/2019 |
| CN | 109547286 A | 3/2019 |
| CN | 108293001 B | 10/2020 |
| CN | 108293009 B | 5/2021 |
| CN | 109076357 B | 6/2021 |
| EP | 3229405 A1 | 10/2017 |

OTHER PUBLICATIONS

Miao et al., "Design and Load Balancing of Mobile IPTV Based on Cloud Computing Platform," Software, vol. 32, No. 1, Total 8 pages (Jan. 20, 2011). With an English abstract.

Li Chun et al., "Optimal Scheduling of Resource Load Balancing in Cloud Computing Environment," Computer Simulation, vol. 34, Issue 12, Total 6 pages (Dec. 2017). With an English abstract.

"Open Edge Computing—Platform Use Cases," V1.0, total 12 pages (Oct. 5, 2017).

* cited by examiner

EDGE SERVICE PROVIDING METHOD AND APPARATUS, AND DEVICE BY UTILIZING RESOURCES BASED ON GEOGRAPHICAL COVERAGE

CROSS-REFERENCE TO RELATED APPLICATIONS

This application is a continuation of International Application No. PCT/CN2020/077619, filed on Mar. 3, 2020, which claims priority to Chinese Patent Application No. 201910518418.4, filed on Jun. 15, 2019. The disclosures of the aforementioned applications are hereby incorporated by reference in their entireties.

TECHNICAL FIELD

This application relates to the field of cloud computing, and in particular, to an edge service providing method, an apparatus configured to perform the method, and a computing device.

BACKGROUND

Cloud computing is a computing mode in which the Internet is used to conveniently use basic resources such as computing infrastructure, storage devices, and applications anytime, anywhere, and on demand. Resources of the conventional cloud computing mode are distributed in a centralized manner geographically. For example, a cloud service provider establishes only a few fixed resource areas nationwide, and resources in a plurality of data centers included in one resource area are used to provide services for terminals distributed throughout the country or even abroad. In some cases, this centralized big data processing manner leads to high bandwidth costs and high delay in an application service provided to a terminal in the cloud computing mode. An edge computing mode is an extension and a supplement to the conventional cloud computing mode. In the edge computing mode, there are edge resource clusters including computing infrastructure, storage devices, and applications. These edge resource clusters are deployed at physical locations near terminals in a distributed manner. Currently, a cloud computing system that integrates advantages of the edge computing and the conventional cloud computing gradually emerges. The cloud computing system includes a central resource cluster and an edge resource cluster. A method for centrally managing resources by using the central resource cluster and providing edge services for terminals by using resources of the edge resource cluster becomes mainstream.

However, in the conventional technology, a method for providing an edge service for a terminal by using a cloud computing system is as follows: The terminal usually needs to first send an edge service request to a central resource cluster. Then, a management node deployed in the central resource cluster returns an address of a target edge node that is in an edge resource cluster and that provides the edge service, or a management node deployed in the central resource cluster forwards the edge service request to a target edge node in an edge resource cluster. Consequently, the method for providing the edge service still leads to a relatively high delay.

SUMMARY

This application provides an edge service providing method. The method can reduce an edge service response delay and optimize edge service experience.

According to a first aspect, this application provides an edge service management method. The method is run in a cloud computing system, the cloud computing system includes a central resource cluster and at least one edge resource cluster, a management node is deployed in the central resource cluster, and an execution node and at least one edge node are deployed in each edge resource cluster. The method includes: The management node determines a target execution node based on an edge service application range, where the edge service application range includes a specified physical area, a specified edge resource cluster, or a subset of a specified edge resource cluster; and the management node sends an edge service policy to the target execution node, where the edge service policy is used by the target execution node to forward an edge service request from a terminal to a target edge node. In the method, the management node located in the central resource cluster determines the target execution node in the edge resource cluster, and sends the edge service policy to the target execution node, so that the target execution node may determine, for the terminal according to the edge service policy, the target edge node that provides the edge service. The method does not need to send the edge service request of the terminal to the central resource cluster, thereby reducing a delay of the cloud computing system responding to the edge service request.

In a possible implementation of the first aspect, the method further includes: The management node receives the edge service application range specified by a tenant, where the edge service application range specified by the tenant includes the physical area specified by the tenant, the edge resource cluster specified by the tenant, or the subset of the edge resource cluster specified by the tenant; or the management node determines, based on information about a tenant, the edge service application range applicable to the tenant. The edge service application range applicable to the tenant is determined by the tenant or determined by the management node based on the information about the tenant, thereby improving flexibility of a range that provides the edge service, and optimizing the determined target execution node.

In a possible implementation of the first aspect, the edge service policy includes a load balancing policy, and the load balancing policy is used by the target execution node to select the target edge node, and is used to implement load balancing of an edge node within the edge service application range. The management node sends the load balancing policy to the execution node, to determine the target edge node for the terminal and implement load balancing between the edge nodes, thereby ensuring stability of providing edge services by a plurality of edge nodes that provide the edge services for the terminal.

In a possible implementation of the first aspect, the method further includes: The management node receives the load balancing policy specified by the tenant; or the management node determines, based on the information about the tenant, the load balancing policy applicable to the tenant. The load balancing policy is specified by the tenant or is determined based on the information about the tenant. This can meet requirements of different tenants and improve flexibility of providing the edge service.

In a possible implementation of the first aspect, that the management node determines a target execution node based on an edge service application range includes: The management node queries, based on the edge service application range, an edge resource cluster management table bound to the tenant, to obtain an IP address of the target execution node. Accuracy of determining the target execution node is improved by querying the table.

In a possible implementation of the first aspect, the edge service application range includes a plurality of application ranges; and the management node selects an application range with a highest priority or a smallest application range as an initial edge service application range.

In a possible implementation of the first aspect, the method further includes: The management node obtains status information of an execution node or the edge node within the edge service application range, and manages the execution node or the edge node within the edge service application range based on the status information.

Optionally, the management node may periodically monitor the execution node and the edge node, to obtain the status information of the execution node or the edge node within the edge service application range.

In the method, the management node manages the execution node and the edge node, to improve stability of providing the edge service by the edge node.

In a possible implementation of the first aspect, the status information includes update information of the edge node within the edge service application range; and the management node sends an update instruction to the execution node based on the update information of the edge node within the edge service application range. When the edge node is updated, the management node notifies the execution node timely, so that the execution node updates stored information about the edge node. This ensures that the execution node obtains the latest information about the edge node, avoids an operation of affecting the determining of the target edge node because the execution node obtains information about an invalid edge node or fails to obtain information about a newly added edge node, and ensures stability of providing the edge service.

In a possible implementation of the first aspect, the status information includes fault information of the execution node within the edge service application range; the management node sends alarm information to an alarm module based on the fault information of the execution node within the edge service application range; and the management node determines, based on the fault information of the execution node within the edge service application range, a standby execution node corresponding to the faulty execution node. The management node performs global management on a fault case of the execution node. In this way, when the execution node is faulty, it is not affected that the cloud computing system provides the edge service for the terminal, or impact can be eliminated timely.

In a possible implementation of the first aspect, the method further includes: The management node updates the edge service application range, where an updated edge service application range is an application range with a low priority or a relatively large application range. The edge service application range is adaptively updated based on a status of the cloud computing system, so that robustness of the cloud computing system can be ensured, and stability of providing the edge service for the terminal can be ensured.

According to a second aspect, this application provides an edge service providing method. The method is run in a cloud computing system, the cloud computing system includes a central resource cluster and at least one edge resource cluster, a management node is deployed in the central resource cluster, and an execution node and at least one edge node are deployed in each edge resource cluster. The method includes: The execution node receives an edge service policy sent by the management node; the execution node receives an edge service request from a terminal, and determines, according to the edge service policy, a target edge node that provides an edge service for the terminal; and the execution node forwards the edge service request to the target edge node. In the method, the execution node deployed in the edge resource cluster is used to determine the target edge node for the terminal that sends the edge service request. In the method, the edge service request does not need to be sent to the management node in the central resource cluster, so that a delay of the method for providing the edge service for the terminal by using a resource in the edge resource cluster is greatly reduced.

In a possible implementation of the second aspect, the edge service policy includes a load balancing policy, and the load balancing policy is used by the execution node to select the target edge node, and is used to implement load balancing of an edge node within an edge service application range. The target edge node that provides the edge service for the terminal is determined according to the load balancing policy, so that the target edge node is determined for the terminal, and load balancing between the edge nodes can be implemented. This ensures stability of providing the edge service by a plurality of edge nodes that provide the edge service for the terminal.

In a possible implementation of the second aspect, the load balancing policy is specified by a tenant or determined by the management node based on information about a tenant. The load balancing policy is specified by the tenant or is determined based on the information about the tenant. This can meet requirements of different tenants and improve flexibility of providing the edge service.

In a possible implementation of the second aspect, the edge service application range is specified by a tenant or determined by the management node based on information about a tenant. The edge service application range applicable to the tenant is determined by the tenant or determined by the management node based on the information about the tenant, thereby improving flexibility of a range that provides the edge service.

In a possible implementation of the second aspect, the method further includes: The execution node obtains information about the at least one edge node; and that the execution node determines, according to the edge service policy, a target edge node that provides an edge service for the terminal includes: The execution node determines, according to the edge service policy and based on the information about the at least one edge node, the target edge node that provides the edge service for the terminal. The target edge node is determined with reference to the information about each edge node, so that the finally determined target edge node is optimal, and a more stable edge service can be provided for the terminal.

In a possible implementation of the second aspect, the information about the at least one edge node includes fault information of the at least one edge node and location information of the at least one edge node.

In a possible implementation of the second aspect, the method further includes: The execution node receives an update instruction sent by the management node, where the update instruction includes update information of the edge node within the edge service application range; and the execution node updates the stored information about the at least one edge node according to the update instruction. When the edge node is updated, the execution node updates the stored information about the edge node timely according to the update instruction. This ensures that the execution node obtains the latest information about the edge node, avoids an operation of affecting the determining of the target edge node because the execution node obtains information about an invalid edge node or fails to obtain information about a newly added edge node, and ensures stability of providing the edge service.

In a possible implementation of the second aspect, the method further includes: The execution node obtains the fault information of the at least one edge node; and the execution node sends alarm information to an alarm module based on the fault information of the at least one edge node. The execution node notifies the alarm module of information about a faulty edge node timely, so that the system administrator can take measures to rectify the fault on the faulty edge node timely, thereby improving stability of providing the edge service.

According to a third aspect, this application provides an edge service management apparatus. The apparatus is deployed in a central resource cluster in a cloud computing system, the cloud computing system includes the central resource cluster and at least one edge resource cluster, and an execution node and at least one edge node are deployed in each edge resource cluster. The apparatus includes: a determining module, configured to determine a target execution node based on an edge service application range, where the edge service application range includes a specified physical area, a specified edge resource cluster, or a subset of a specified edge resource cluster; and a policy sending module, configured to send an edge service policy to the target execution node, where the edge service policy is used by the target execution node to forward an edge service request from a terminal to a target edge node.

In a possible implementation of the third aspect, the determining module is further configured to receive the edge service application range specified by a tenant, where the edge service application range specified by the tenant includes the physical area specified by the tenant, the edge resource cluster specified by the tenant, or the subset of the edge resource cluster specified by the tenant; or the determining module is further configured to determine, based on information about a tenant, the edge service application range applicable to the tenant.

In a possible implementation of the third aspect, the edge service policy includes a load balancing policy, and the load balancing policy is used by the target execution node to select the target edge node, and is used to implement load balancing of an edge node within the edge service application range.

In a possible implementation of the third aspect, the determining module is further configured to receive the load balancing policy specified by the tenant, or the management node determines, based on the information about the tenant, the load balancing policy applicable to the tenant.

In a possible implementation of the third aspect, the determining module is specifically configured to query, based on the edge service application range, an edge resource cluster management table bound to the tenant, to obtain an IP address of the target execution node.

In a possible implementation of the third aspect, the edge service application range includes a plurality of application ranges; and the determining module is further configured to select an application range with a highest priority or a smallest application range with as an initial edge service application range.

In a possible implementation of the third aspect, the apparatus further includes: a management module, configured to obtain status information of an execution node or the edge node within the edge service application range, and manage the execution node or the edge node within the edge service application range based on the status information.

In a possible implementation of the third aspect, the status information includes update information of the edge node within the edge service application range; and the management module is further configured to send an update instruction to the execution node based on the update information of the edge node within the edge service application range.

In a possible implementation of the third aspect, the status information includes fault information of the execution node within the edge service application range. The management module is further configured to: send alarm information to an alarm module based on the fault information of the execution node within the edge service application range, and the management node determines, based on the fault information of the execution node within the edge service application range, a standby execution node corresponding to the faulty execution node.

In a possible implementation of the third aspect, the management module is further configured to update the edge service application range, where an updated edge service application range is an application range with a low priority or a relatively large application range.

According to a fourth aspect, this application provides an edge service providing apparatus. The apparatus is deployed in at least one edge resource cluster in a cloud computing system, the cloud computing system includes a central resource cluster and the at least one edge resource cluster, a management node is deployed in the central resource cluster, and at least one edge node is further deployed in each edge resource cluster. The apparatus includes: a determining module, configured to receive an edge service policy sent by the management node, and further configured to: receive an edge service request from a terminal, and determine, according to the edge service policy, a target edge node that provides an edge service for the terminal; and a forwarding module, configured to forward the edge service request to the target edge node.

In a possible implementation of the fourth aspect, the edge service policy includes a load balancing policy, and the load balancing policy is used by an execution node to select the target edge node, and is used to implement load balancing of an edge node within an edge service application range.

In a possible implementation of the fourth aspect, the load balancing policy is specified by a tenant or determined by the management node based on information about a tenant.

In a possible implementation of the fourth aspect, the edge service application range is specified by a tenant or determined by the management node based on information about a tenant.

In a possible implementation of the fourth aspect, the apparatus further includes: an obtaining module, configured to obtain information about the at least one edge node. The determining module is specifically configured to determine, according to the edge service policy and based on the information about the at least one edge node, the target edge node that provides the edge service for the terminal.

In a possible implementation of the fourth aspect, the information about the at least one edge node includes fault information of the at least one edge node and location information of the at least one edge node.

In a possible implementation of the fourth aspect, the apparatus further includes: an update module, configured to receive an update instruction sent by the management node, where the update instruction includes update information of the edge node within the edge service application range; and further configured to update the stored information about the at least one edge node according to the update instruction.

In a possible implementation of the fourth aspect, the obtaining module is further configured to obtain the fault information of the at least one edge node, and is further configured to send alarm information to an alarm module based on the fault information of the at least one edge node.

According to a fifth aspect, this application provides a computing device. The computing device includes a memory and a processor, the memory stores computer instructions, and the processor reads the computer instructions stored in the memory to perform the method according to the first aspect or any one of the possible implementations of the first aspect.

According to a sixth aspect, this application provides a computing device. The computing device includes a memory and a processor, the memory stores computer instructions, and the processor reads the computer instructions stored in the memory to perform the method according to the second aspect or any one of the possible implementations of the second aspect.

According to a seventh aspect, this application provides a non-transitory readable storage medium. When the non-transitory readable storage medium is performed by a computing device, the computing device performs the method according to the first aspect or any one of the possible implementations of the first aspect. The storage medium stores a program. The storage medium includes but is not limited to a volatile memory such as a random access memory, or a nonvolatile memory such as a flash memory, a hard disk drive (HDD), or a solid-state drive (SSD).

According to an eighth aspect, this application provides a non-transitory readable storage medium. When the non-transitory readable storage medium is performed by a computing device, the computing device performs the method according to the second aspect or any one of the possible implementations of the second aspect. The storage medium stores a program. The storage medium includes but is not limited to a volatile memory such as a random access memory, or a nonvolatile memory such as a flash memory, an HDD, or an SSD.

According to a ninth aspect, this application provides a computing device program product. The computing device program product includes computer instructions, and when the computer instructions are executed by a computing device, the computing device performs the method according to the first aspect or any one of the possible implementations of the first aspect. The computer program product may be a software installation package. When the method according to the first aspect or any one of the possible implementations of the first aspect needs to be used, the computer program product may be downloaded, and the computer program product may be executed on the computing device.

According to a tenth aspect, this application provides a computing device program product. The computing device program product includes computer instructions, and when the computer instructions are executed by a computing device, the computing device performs the method according to the second aspect or any one of the possible implementations of the second aspect. The computer program product may be a software installation package. When the method according to the second aspect or any one of the possible implementations of the second aspect needs to be used, the computer program product may be downloaded, and the computer program product may be executed on the computing device.

BRIEF DESCRIPTION OF DRAWINGS

To describe technical methods in embodiments of this application more clearly, the following briefly describes the accompanying drawings for describing the embodiments.

DESCRIPTION OF EMBODIMENTS

Figure 1:
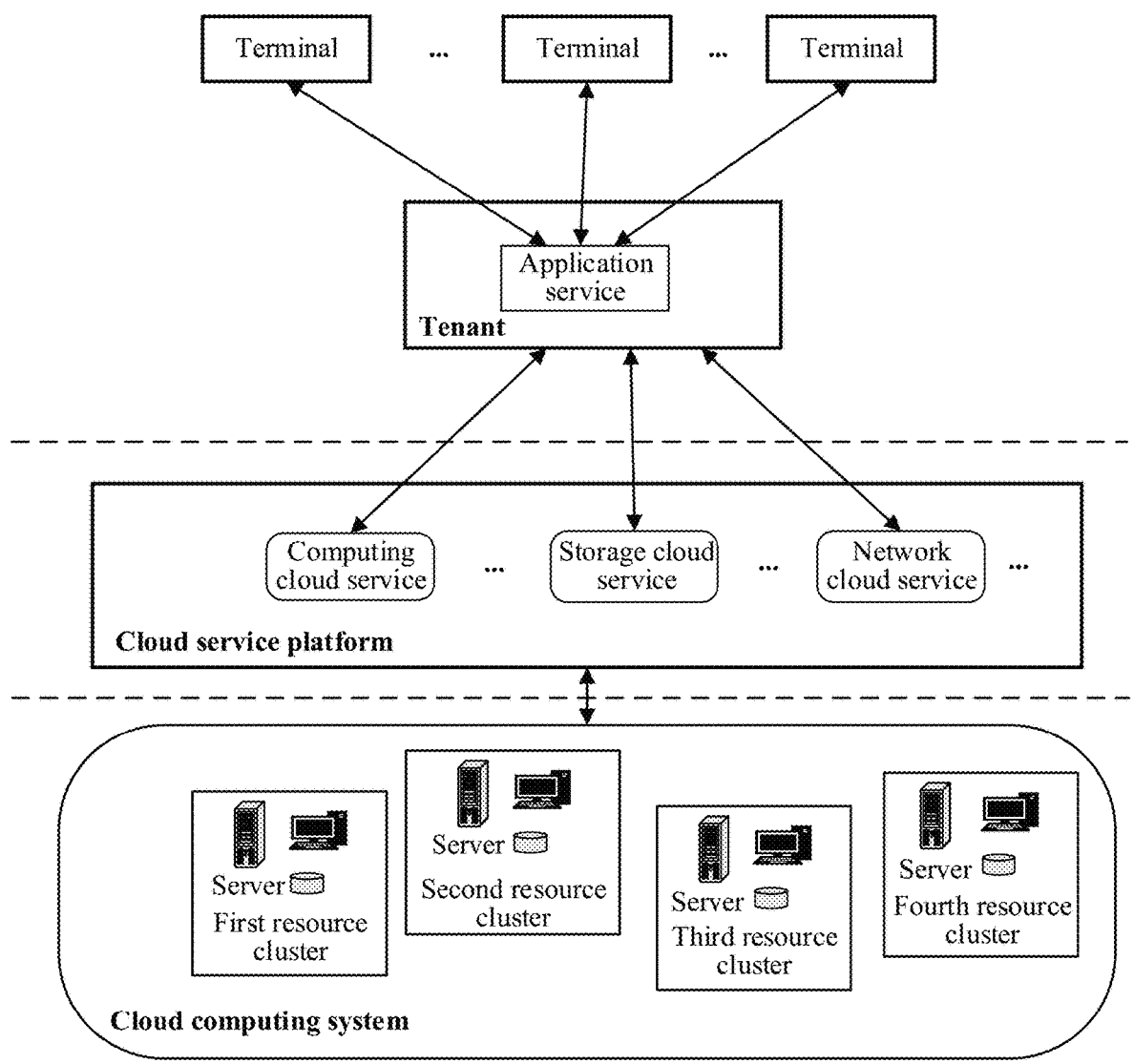
FIG. 1 is a schematic diagram of cloud computing and edge computing modes according to an embodiment of this application.

The following describes the solutions in the embodiments provided in this application with reference to the accompanying drawings in this application.

A cloud computing system is a basic resource system deployed by a cloud service provider, and includes a plurality of resource clusters. Each resource cluster usually includes a plurality of physical servers. The plurality of resource clusters may be classified based on physical locations. For example, resources in a same physical location area belong to a same resource cluster, and a resource cluster whose physical location is relatively close to a terminal in a geographic area is referred to as an edge resource cluster. Alternatively, the plurality of resource clusters may be classified based on functions. For example, a resource cluster that provides a function of managing the plurality of resource clusters is referred to as a central resource cluster.

A cloud service is a service abstracted based on basic resources in a cloud computing system. A cloud service provider provides the basic resource in the cloud computing system for a tenant in an Internet cloud service manner.

A cloud service platform is a platform used by a cloud service provider to provide a cloud service for a tenant. The tenant may purchase the cloud service on the cloud service platform, that is, lease a basic resource of a cloud computing system.

A tenant is an individual, enterprise, or organization that purchases a cloud service on a cloud service platform. The tenant purchases the cloud service to obtain permission to use some basic resources provided by a cloud service provider. The tenant uses these basic resources to run an application service program of the tenant to provide an application service for a terminal.

It should be noted that the cloud service provider may also run an application service program by using some basic resources of the cloud service provider. In this case, the cloud service provider is not only a subject that provides a cloud service for another tenant, but also a tenant, and the cloud service provider leases the basic resources of the cloud service provider to provide an application service for the terminal.

A terminal is a device that uses an application service program of a tenant. The terminal includes but is not limited to a smartphone, a smart camera, a smart watch, a smart printer, a camera, a portable computer, a desktop computer, and the like.

An application service is a service provided by a tenant for a terminal by using a basic resource, of a cloud computing system, leased by the tenant. Application services provided by the tenant for the terminal may be classified into a central service, an edge service, and a hybrid service based on a relationship between the terminal and a resource cluster. The central service is an application service provided by the tenant for the terminal by using a resource in a central resource cluster. The edge service is an application service provided by the tenant for the terminal by using a resource in a resource cluster (namely, an edge resource cluster) that is relatively close to the terminal (for example, a speech recognition server deployed in the edge resource cluster receives a speech signal sent by the terminal, to provide a real-time speech recognition service for the terminal). The hybrid service is an application service provided by the tenant for the terminal by using resources in the central resource cluster and the edge resource cluster (for example, in an edge computing-based cloud game architecture, a game rendering server in the edge resource cluster that is relatively close to the terminal is responsible for rendering a game picture, and a game data server deployed in the central resource cluster is responsible for work such as basic game logic, data, and service processing).

FIG. 1 is a schematic diagram of a service mode of cloud computing. A cloud service provider has a large quantity of basic resources (including computing resources, storage resources, network resources, and the like), and the basic resources include a plurality of resource clusters (such as a first resource cluster, a second resource cluster, a third resource cluster, and a fourth resource cluster shown in FIG. 1). Each resource cluster includes a plurality of physical servers. Resources in these resource clusters may be used to provide application services for terminals that are distributed in different geographical locations (for example, the first resource cluster located in North China to Beijing is leased by a tenant and is used to provide application services for terminals that are located in provinces and cities throughout the country). The first resource cluster may also be referred to as a central resource cluster because management software of a cloud service platform is deployed. The second resource cluster, the third resource cluster, and the fourth resource cluster are resource clusters that are deployed relatively close to the terminals. These resource clusters are separately deployed in different geographical locations and are separately close to terminals in different geographical locations. Therefore, the second resource cluster, the third resource cluster, and the fourth resource cluster may also be referred to as edge resource clusters. The cloud service provider establishes a cloud service platform based on these basic resources, and the cloud service platform provides cloud services for tenants. The cloud service platform provides various cloud services, for example, a computing cloud service such as a virtual machine (VM) established based on computing resources (such as servers), a storage cloud service such as block storage or object storage established based on storage resources (such as, hard disks or solid-state drives or storage arrays in servers), and a network cloud service such as a content delivery network established based on network resources (such as various gateway devices and switching devices). A tenant purchases one or more cloud services on the cloud service platform, that is, the tenant leases some resources of at least one central resource cluster or edge resource cluster. The tenant runs an application of the tenant by using these leased resources, to provide application services for terminals. Based on locations of resources used by the application run by the tenant, the application services provided by the tenant for the terminals may be classified into a central service and an edge service. The central service is an application service provided by the tenant for the terminals by using resources in the central resource cluster, and the edge service is an application service provided by the tenant for the terminals by using resources in the edge resource cluster.

Currently, in a mode of providing an edge service for a terminal by using resources in an edge resource cluster of a cloud computing system, to determine a target edge node that provides an edge service for a terminal from a plurality of edge nodes that can be configured to provide edge services, an edge service request sent by the terminal needs to be first sent to a management node in a central resource cluster, or information for determining the target edge node needs to be obtained from the management node in the central resource cluster. In this way, the target edge node that provides the edge service can be determined. In a process of determining the target edge node for the terminal, the management node deployed in the central resource cluster may alternatively select the target edge node according to a load balancing policy, to implement load balancing between a plurality of edge nodes. That is, the load balancing policy is used to allocate edge service requests sent by terminals to avoid overload of edge nodes and optimize resource utilization. The management node deployed in the central resource cluster is responsible for determining the target edge node for the terminal according to the load balancing policy, and is configured to implement load balancing of edge nodes within a specific range. In this method, a delay of using resources of the edge resource cluster to provide an edge service is relatively high.

Based on the foregoing problem, the following describes in detail the embodiments provided in this application with reference to the accompanying drawings. This application provides an edge service providing method by using a cloud computing system. The method may resolve a problem of a high response delay of an edge node to an edge service. According to the method provided in this application, the cloud computing system may provide a low-delay and stable edge service for a terminal, and the terminal may achieve better edge service experience. It should be understood that the embodiment described below is merely an implementation of the method provided in this application, and does not limit the method.

Figure 2:
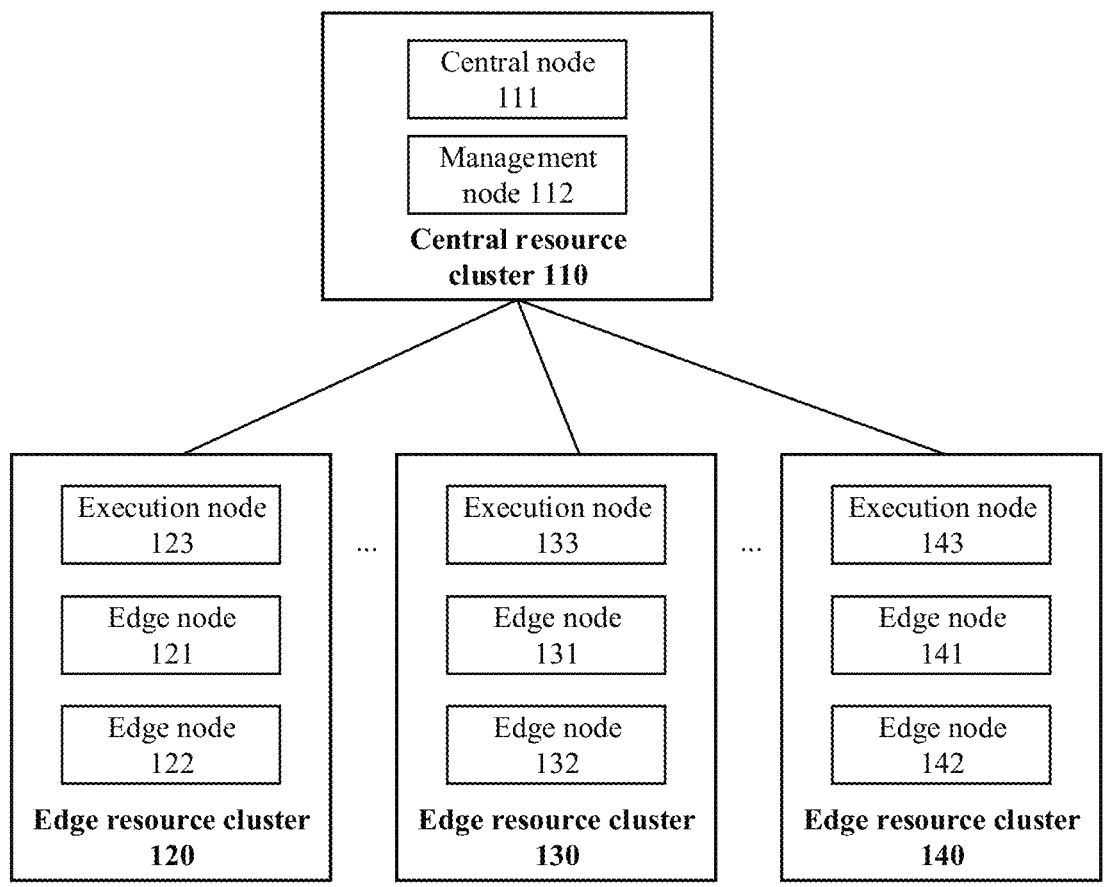
FIG. 2 is a schematic diagram of a composition of a cloud computing system 100 according to an embodiment of this application.

FIG. 2 is a schematic diagram of a composition of a cloud computing system 100 according to an embodiment of this application. The cloud computing system 100 includes a central resource cluster 110 and a plurality of edge resource clusters 120, 130, and 140. As shown in the figure, the central resource cluster 110 usually includes a plurality of data centers (such as an equipment room). Each data center includes a plurality of central nodes 111 configured to provide central services. The central resource cluster 110 further includes at least one management node 112. The management node 112 is configured to manage the central nodes 111 in the central resource cluster 110 and manage an edge node and an execution node in each edge resource cluster. The edge resource clusters 120, 130, and 140 each are a set of edge data centers (or edge computing devices) deployed in different geographical areas. Each edge resource cluster includes a plurality of edge nodes, and each edge resource cluster further includes at least one execution node. The execution node is deployed in the edge resource cluster and is configured to receive an edge service request sent by a terminal and determine a target edge node for the terminal that sends the edge service request. The execution node implements, according to an edge service policy sent by the management node in the central resource cluster, load balancing between edge nodes in one edge resource cluster or between edge nodes in all edge resource clusters. As shown in FIG. 2, the edge resource cluster 120 includes an edge node 121, an edge node 122, and an execution node 123. For a terminal that is located in a same geographical area (for example, Shenzhen, Guangdong, South China) as the edge resource cluster 120, the edge node 121 or 122 is used to provide an edge service for the terminal in the geographic area, and this can effectively reduce bandwidth costs and reduce a service delay. For example, a tenant A leases a resource of one or two of the edge nodes 121 and 122 in the edge resource cluster 120 on a cloud service platform. A same application service program is deployed on both the edge node 121 and the edge node 122, and both the edge node 121 and the edge node 122 can be used to provide the terminal with an edge service (for example, an intelligent facial recognition service, a real-time speech recognition service, and a live game service). The terminal in the geographic area sends an edge service application request, the edge service application request is routed to the execution node 123, and the execution node 123 determines, for the terminal based on information about the edge node 121 and the edge node 122 and according to an edge service policy delivered in advance by the management node, that the edge node 121 is to respond to the edge service request of the terminal. Therefore, the edge node 121 provides the edge service for the terminal.

The edge resource cluster 120, the edge resource cluster 130, and the edge resource cluster 140 may be communicatively connected to the central resource cluster 110 through communications channels. Optionally, the edge resource cluster 120, the edge resource cluster 130, and the edge resource cluster 140 may also be communicatively connected to each other through communications channels. Optionally, the edge node 121 and the edge node 122 in the edge resource cluster 120 may also be communicatively connected to each other through a communications channel. The cloud service provider further establishes a cloud service platform by using some resources of the central resource cluster 110, and provides a cloud service for a tenant by using the cloud service platform. The tenant purchases the cloud service on the cloud service platform to lease resources in the central resource cluster 110, the edge resource cluster 120, the edge resource cluster 130, or the edge resource cluster 140.

Optionally, the edge resource cluster in this application may include operator devices. For example, in the edge resource cluster 120, not only a server that is deployed by the cloud service provider and that is configured to provide a resource exists, but also a switch, a routing device, and the like that are deployed by an operator are included. The operator devices are configured to forward data, transmit data, and the like between the terminal and the edge resource cluster.

Optionally, the edge resource cluster in this application may be bound to an operator. That is, an application service deployed by the tenant on a resource of the edge resource cluster is provided for a terminal of a subscriber of only the operator. For example, if the edge resource cluster 120 is bound to China Mobile, an edge service is provided for a terminal of only China Mobile; and if the edge resource cluster 130 is bound to China Telecom, an edge service is provided for a terminal of only China Telecom. One edge resource cluster may alternatively be bound to a plurality of operators and is used to provide edge services for terminals of subscribers of the plurality of operators. When the edge resource cluster is not bound to an operator, an edge service application deployed in the edge resource cluster may be used by default to provide edge services for terminals of subscribers of all operators in the area.

This application provides an edge service providing method. In the method, functions of determining a target edge node for a terminal and implementing load balancing between a plurality of edge nodes are transferred from a central resource cluster to each edge resource cluster. In this way, an edge service request does not need to be sent to the central resource cluster in a process of providing an edge service by using a resource of the edge resource cluster, and therefore, a delay of providing the edge service can be reduced, and load balancing can be implemented.

Figure 3:
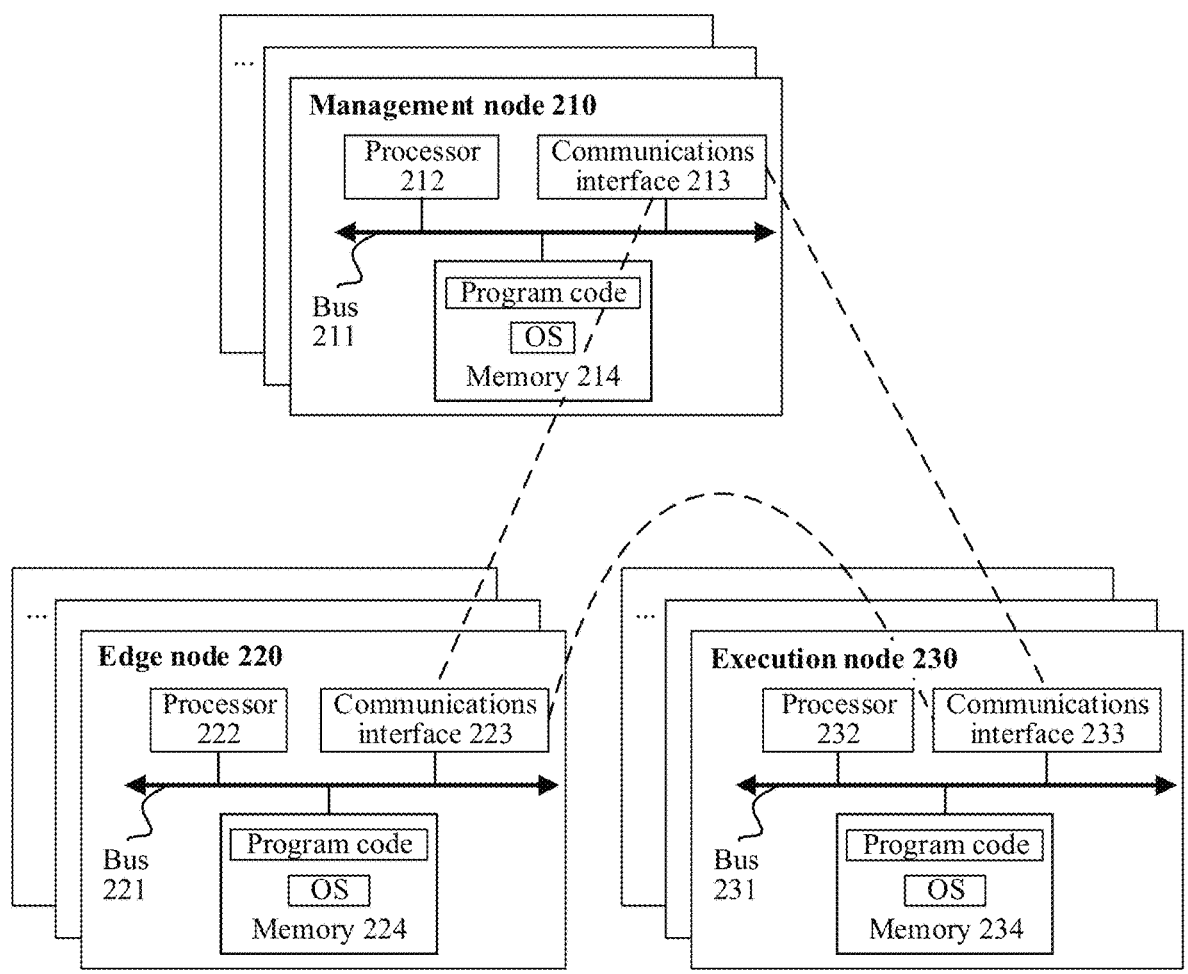
FIG. 3 is a schematic diagram of structures of a management node 210, an edge node 220, and an execution node 230 according to an embodiment of this application.

The management node, the edge node, and the execution node in this application each may be a physical machine, a virtual machine, or a software module run on the physical machine or the virtual machine. When the management node is a physical machine deployed in the central resource cluster, and both the edge node and the execution node are physical machines deployed in the edge resource cluster, as shown in FIG. 3, the management node 210, the edge node 220, and the execution node 230 may perform data communication through an external bus. It should be noted that, in FIG. 3, the management node 210 may be the management node 112 in FIG. 2, the edge node 220 may be the edge node 121 or the edge node 122 in FIG. 2, and the execution node 230 may be the execution node 123 in FIG. 2. It should be noted that at least one edge node 220 and at least one execution node 230 may exist in one edge resource cluster, and at least one management node 210 may exist in one central resource cluster.

The management node 210 includes a bus 211, a processor 212, a communications interface 213, and a memory 214. The processor 212, the memory 214, and the communications interface 213 communicate with each other through the bus 211. The processor 212 may be a central processing unit (CPU). The memory 214 may include a volatile memory, for example, a random access memory (RAM). The memory 214 may further include a non-volatile memory, for example, a read-only memory (ROM), a flash memory, an HDD, or an SSD. The memory 214 stores program code, and the processor 212 executes the program code to perform management operations on the edge node 220 and the execution node 230. The memory 214 may further include a software module required by another running process, such as an operating system (OS). The OS may be LINUX™, UNIX™, WINDOWS™, or the like.

The edge node 220 includes a bus 221, a processor 222, a communications interface 223, and a memory 224. The processor 222, the memory 224, and the communications interface 223 communicate with each other through the bus 221. The processor 222 may be a central processing unit (CPU). The memory 224 may include a volatile memory, for example, a random access memory (RAM). The memory 224 may further include a non-volatile memory, for example, a read-only memory (ROM), a flash memory, an HDD, or an SSD. The memory 224 stores program code, and the processor 222 executes the program code to perform an operation of providing an edge service for a terminal. The memory 224 may further include a software module required by another running process, such as an OS. The OS may be LINUX", UNIX", WINDOWS™, or the like.

The execution node 230 includes a bus 231, a processor 232, a communications interface 233, and a memory 234. The processor 232, the memory 234, and the communications interface 233 communicate with each other through the bus 231. The processor 232 may be a central processing unit (CPU). The memory 234 may include a volatile memory, for example, a random access memory (RAM). The memory 234 may further include a non-volatile memory, for example, a read-only memory (ROM), a flash memory, an HDD, or an SSD. The memory 234 stores program code, and the processor 232 executes the program code to perform operations of determining a target edge execution node for a terminal and implementing load balancing. The memory 224 may further include a software module required by another running process, such as an OS. The OS may be LINUX', UNIX™, WINDOWS', or the like.

Figure 4A:
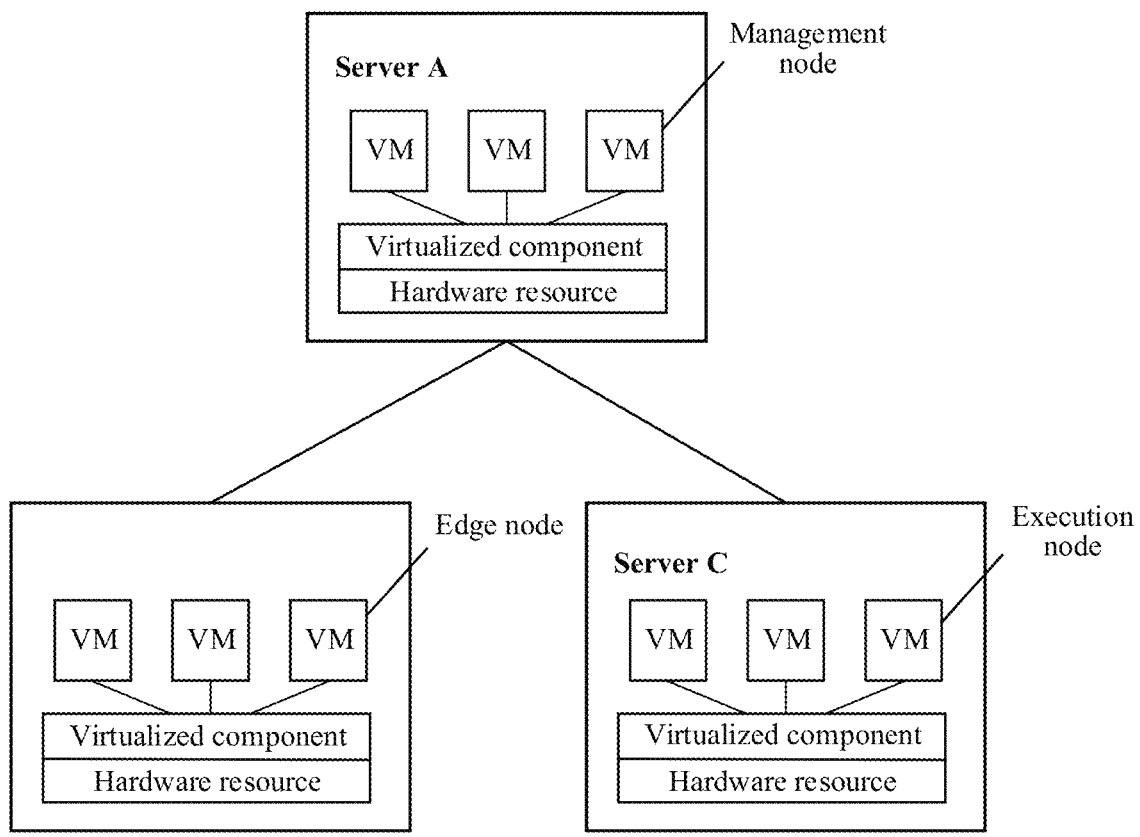
FIG. 4A is a schematic diagram of deployment of a management node, an edge node, and an execution node according to an embodiment of this application.
Figure 4B:
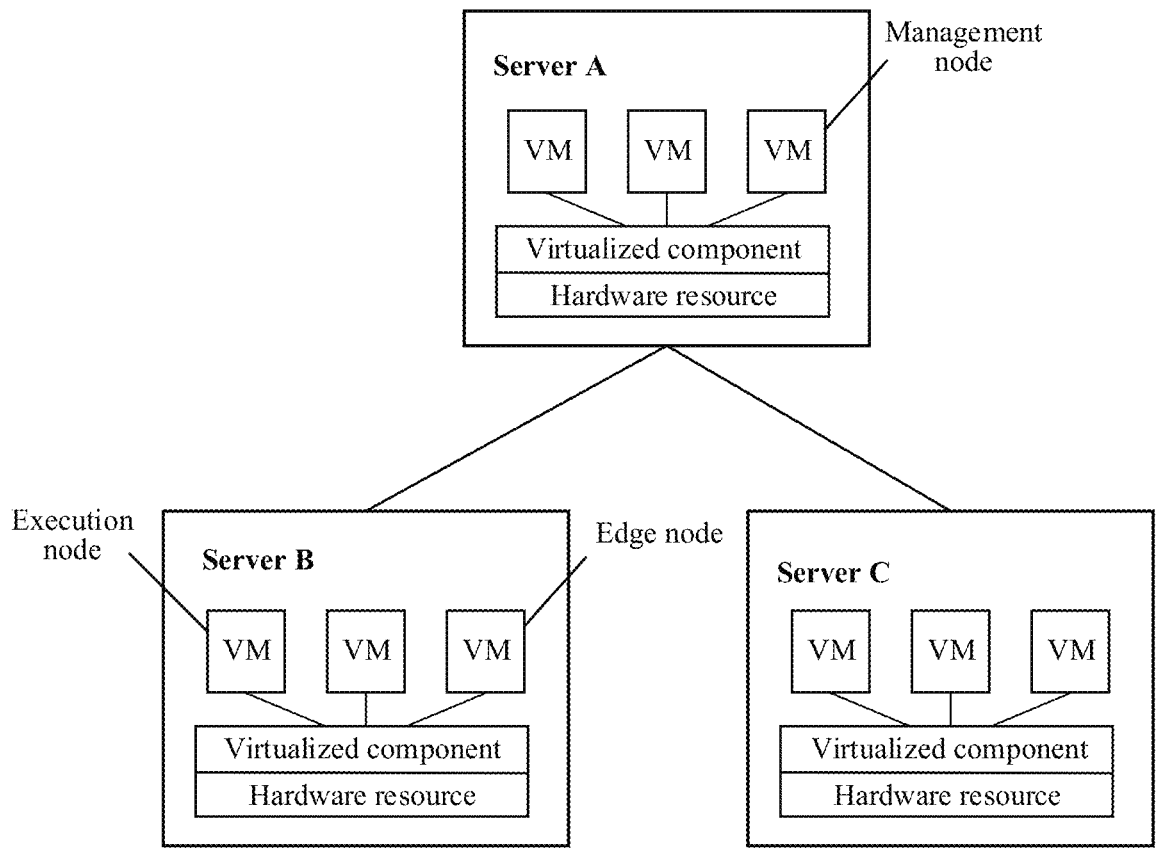
FIG. 4B is another schematic diagram of deployment of a management node, an edge node, and an execution node according to an embodiment of this application.

When a function of the management node is implemented by the virtual machine of the physical server running in the central resource cluster, and functions of the edge node and the execution node are implemented by the virtual machine of the physical server running in the edge resource cluster. As shown in FIG. 4A, hardware resources in a server A in a central resource cluster form a plurality of virtual machines by using the virtualization technology. Each VM may be configured to provide a different function. One VM in the server A serves as a management node and is configured to manage an edge node and an execution node in at least one edge resource cluster. A server B and a server C are physical machines in a same edge resource cluster. Hardware resources in the server B and the server C both form a plurality of VMs by using the virtualization technology. One VM in the server B is a VM leased by a tenant, and the VM is used as the edge node to provide an edge service for a terminal. One VM in the server C is used as the execution node. The execution node is configured to determine a target edge node for a terminal that sends an edge service request, and implement load balancing between edge nodes leased by the tenant within a specific range. It should be noted that when both the execution node and the edge node are VMs, the execution node and the edge node may be VMs on a same server, as shown in FIG. 4B.

When functions of the management node, the edge node, and the execution node are all implemented by a software module, the management node is program code stored in a memory of a physical machine or a virtual machine in the central resource cluster, and the physical machine and the virtual machine read the program code by using a processor and execute a corresponding management function. The edge node and the execution node may be stored in a memory of one physical machine in the edge resource cluster, or may be stored in a memory of one VM of the physical machine, or may be separately stored in memories of two VMs in one physical machine, or may be separately stored in memories of two physical machines or memories of VMs in the two physical machines.

It should be noted that in this application, there may be a plurality of management nodes, edge nodes, and execution nodes. The plurality of management nodes are deployed in a distributed manner in the central resource cluster, and the edge nodes and the execution nodes are deployed in a distributed manner in the edge resource cluster. Each management node, each edge node, or each execution node may randomly be a physical machine, a virtual machine, or a software module run on the physical machine or the virtual machine. For example, in the plurality of management nodes, some are physical machines, some are virtual machines, and some are software modules. For another example, the management nodes are virtual machines, the edge nodes are physical machines, and the execution nodes are software modules.

The edge service providing method provided in this application may mainly be divided into three phases: a pre-deployment phase, a policy delivery phase, and a policy execution phase. These three phases have a time sequence relationship. First, a cloud service provider pre-deploys a management node and an execution node in a cloud computing system. Then, the pre-deployed management node receives an edge service policy (including a load balancing policy) configured by a tenant, and the management node delivers the edge service policy to the execution node in an edge resource cluster. After the policy is delivered, in a process in which a terminal uses an edge service provided by the tenant, the execution node located in the edge resource cluster receives an edge service request sent by the terminal, and the execution node determines, according to the edge service policy, a target edge node that provides the edge service for the terminal, and forwards the edge service request to the target edge node, to implement load balancing between a plurality of edge nodes.

Pre-Deployment Phase

Figure 5:
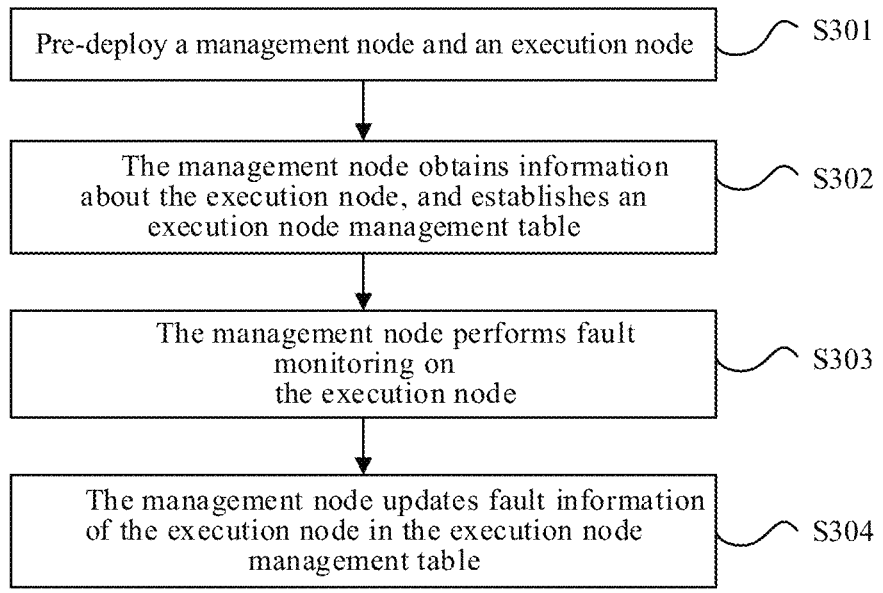
FIG. 5 is a schematic flowchart of pre-deployment according to an embodiment of this application.

FIG. 5 is a schematic flowchart of a pre-deployment phase.

5301: Pre-deploy the management node and the execution node.

The management node and the execution node are pre-deployed in the cloud computing system by the cloud service provider. Optionally, execution nodes may be deployed in a plurality of edge resource clusters. Usually, the management node is deployed in one resource cluster. The resource cluster in which the management node is deployed is referred to as a central resource cluster. The management node may manage the execution nodes in the plurality of edge resource clusters.

It should be noted that, after pre-deployment is completed, the execution node advertises an IP address of the execution node (or an IP address of a node in which the execution node is deployed), and sends information about the execution node to an operator device (such as a router or a switch). The operator device records information about each execution node and advertises a route.

Optionally, in this application, a plurality of execution nodes in an edge resource cluster may advertise a same anycast IP, and advertise a routing policy (for example, equal-cost route or dynamic measurement selection) to the operator device. In this way, an edge service request sent by a terminal can be routed to a nearest execution node.

Optionally, in this application, the IP address of the execution node in the edge resource cluster may be registered with a hypertext transfer protocol (HTTP) domain name server (DNS). In this way, when sending a request, the terminal first accesses the HTTP DNS; and the HTTP DNS returns an IP address of an edge node of the nearest execution node to the terminal based on a stored location database.

S302: The management node obtains the information about the execution node, and establishes an execution node management table.

Specifically, each execution node in the edge resource cluster establishes a communication connection to the management node, and the management node obtains information about each execution node and establishes the execution node management table. Information in the execution node management table includes any one or more of the following:

(1) an ID of the edge resource cluster in which the execution node is located;

(2) a location line (for example, Shenzhen data center, Guangdong, South China) of the edge resource cluster in which the execution node is located;

(3) an Internet protocol (IP) address of the execution node;

(4) fault information (for example, normal, faulty, or uncertain) of the execution node;

(5) an ID of an edge resource cluster in which a standby execution node is located; and (6) an IP address of the standby execution node.

It should be noted that, because a plurality of edge resource clusters may exist, and each edge resource cluster may include a plurality of execution nodes, the execution node management table separately records IP addresses and fault information of the plurality of execution nodes in each edge resource cluster.

For example, the execution node management table in the management node is as follows:

| Site_ID | Line | Node_IP | Status |
|---|---|---|---|
| Shenzhen. X | cn_telecom_shenzhen_guangdong_huanan | 1.1.1.0/24 | pending |
|  |  | 1.1.1.0/24 | fail |
| Beijing. Y | cn_mobile_beijing_huabei | 1.1.1.0/24 | pending |
| ... | ... | ... | ... |

Optionally, the execution node in each edge resource cluster in the foregoing execution node management table may correspond to at least one standby execution node in the same edge resource cluster or another edge resource cluster, and the standby execution node is usually an execution node that is relatively close to the execution node in terms of a geographical location.

S303: The management node performs fault monitoring on the execution node.

Specifically, the management node sends a detection packet to the execution node, to obtain a response from the execution node.

S304: The management node updates the fault information of the execution node in the execution node management table based on the response of the execution node.

For example, the management node may preset a delay threshold of a response to the detection packet, and determine, based on a result of comparison between a delay of receiving the response to the detection packet and a preset delay threshold, whether the execution node is faulty. If the delay of the response to the detection packet is less than or equal to the preset delay threshold, it is determined that the execution node that returns the response is normal. If the delay of the response to the detection packet is greater than the preset delay threshold, it is determined that the execution node that returns the response is faulty, and the determined fault information is updated to the execution node management table.

It should be noted that S303 and S304 are periodically performed after the pre-deployment of the management node and the execution node is completed, to implement dynamic monitoring by the management node on the execution node.

Optionally, in an execution process of S303 and S304, when the management node determines, based on the response of the execution node, that the execution node is faulty, the management node sends the fault information of the execution node to an alarm module, to enable the alarm module to generate a fault alarm. The alarm module may be a module in a same physical machine as the execution node, or may be a module in another physical machine or virtual machine in the cloud computing system.

Policy Delivery Phase

The tenant leases a resource of the edge resource cluster in the cloud computing system by using a cloud service platform, and after an application service program is deployed on the edge node in the edge resource cluster, an edge service may be provided for the terminal. To enable the terminal to obtain an optimized edge service path and avoid that edge service experience of the terminal is affected by the edge node due to overload, fault, or the like, the tenant may lease a load balancing service provided by the cloud service provider, and configure an edge service policy and an edge service application range by using the cloud service platform.

Figure 6:
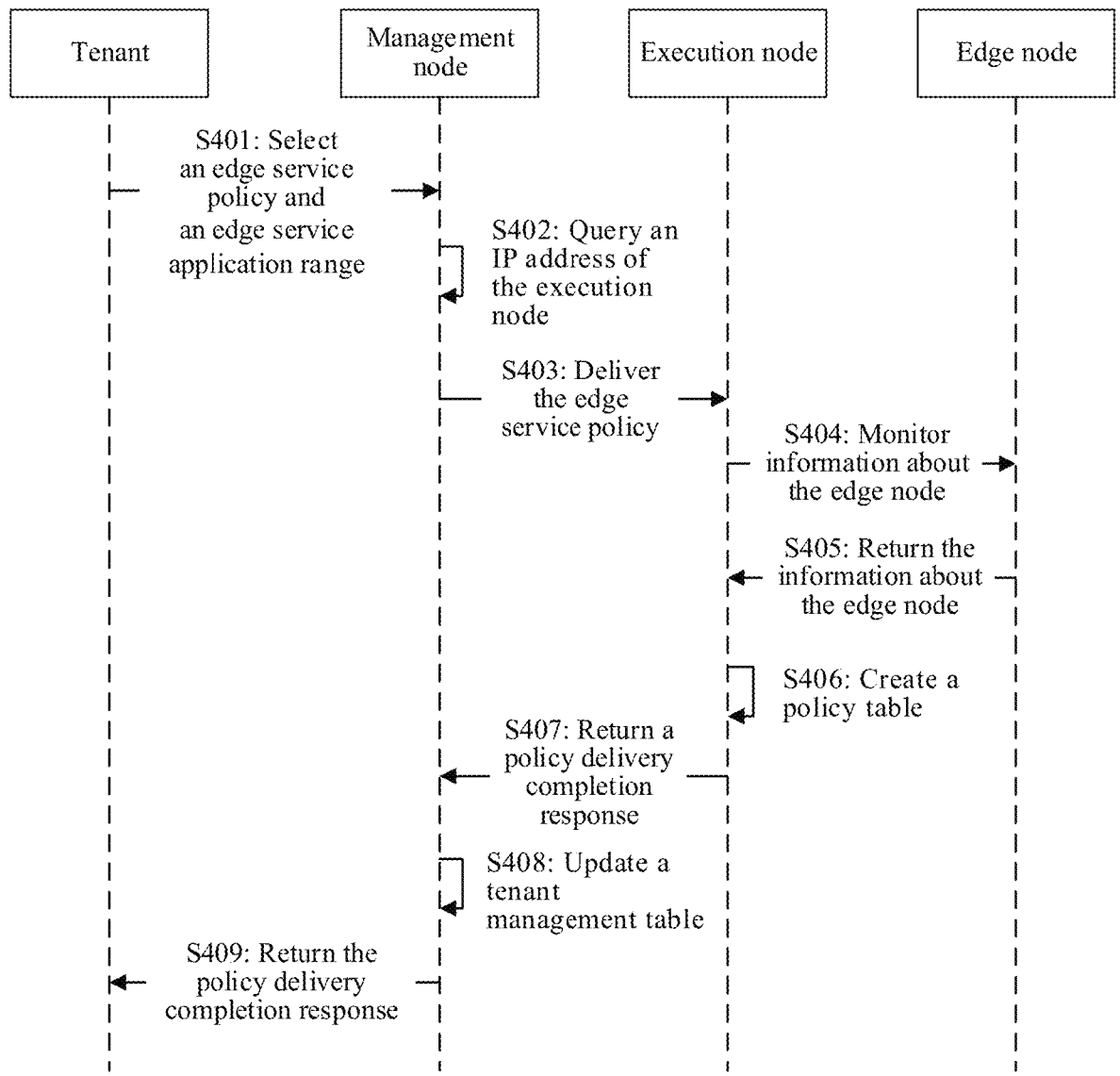
FIG. 6 is a schematic flowchart of policy delivery according to an embodiment of this application.

FIG. 6 is a schematic flowchart of policy delivery according to an embodiment of this application.

S401: The tenant selects the edge service policy and the edge service application range.

The edge service policy selected by the tenant may be used by the execution node to determine the target edge node for the terminal that sends the edge service request. The tenant may select one edge service policy or a combination of a plurality of edge service policies by using the cloud service platform. The edge service policy may be the load balancing policy, and the load balancing policy is a rule that instructs the execution node to determine the target edge node for the terminal and that ensures load balancing between edge nodes. The load balancing policy may include a polling policy, a hash policy, a minimum-time response policy, and the like. Optionally, the tenant may create one or more edge service policies through an editable interface provided by the cloud service provider.

The edge service application range is a range in which the edge service policy selected by the tenant is applied to edge nodes leased by the tenant in resource clusters in the cloud computing system. The tenant may select (select from existing options or manually enter) the edge service application range by using the cloud service platform. The edge service application range may be a physical area specified by the tenant. For example, if the tenant selects Shenzhen, Guangdong, South China on the cloud service platform, the edge service policy is applied to all edge nodes leased by the tenant in one or more edge resource clusters in the Shenzhen, Guangdong, South China area. The edge service application range may alternatively be one or more edge resource clusters specified by the tenant. For example, the tenant queries, on the cloud service platform, one or more edge resource clusters in which edge nodes leased by the tenant are located, and the tenant selects the one or more edge resource clusters as the edge service application range, and the edge service policy selected by the tenant is applied to all the edge nodes leased by the tenant in the one or more edge resource clusters. The edge service application range may alternatively be a subset of an edge resource cluster specified by the tenant. For example, the tenant selects, on the cloud service platform, one or more edge resource clusters in which edge nodes leased by the tenant are deployed, and selects some edge nodes from each edge resource cluster as the edge service application range, and the edge service policy is applied only to these edge nodes selected by the tenant, and the execution node may implement load balancing between these edge nodes according to the load balancing policy.

It should be noted that the edge service application range may be a multi-level range, for example, Shenzhen, Guangdong, South China, which is a three-level edge service application range. For a multi-level edge service application range, the tenant may set priorities. For example, if the tenant sets a priority of a South China area to be the highest, a priority of Guangdong to be the second, and a priority of Shenzhen to be the lowest, the management node uses the South China area as an initial edge service application range in subsequent steps. When an exception occurs (for example, edge nodes within a range are faulty), a range with the second priority is used as the edge service application range. If the tenant selects a multi-level range and does not set a priority for the multi-level range, it is default that a minimum range in the multi-level range has a highest priority, a second smallest range has a second priority, and so on. For example, for the three-level edge service application range of Shenzhen, Guangdong, South China, it is default that Shenzhen has the highest priority and is the initial edge service application range. When a plurality of edge nodes within the minimum range are faulty, overloaded, or the like, the management node may automatically adjust the edge service application range to enable a larger range to become a new edge service application range.

It should be noted that the selected edge service policy and the data of the edge service application range are received by the management node.

It should be noted that the edge service application range may not be specified by the tenant, but is determined by the management node based on tenant information. For example, the management node determines, based on information about physical locations in which edge nodes leased by the tenant on the cloud service platform are located, that a minimum physical area in which all the edge nodes leased by the tenant are located as the edge service application range. For another example, the management node determines, based on an ID or IDs of one or more edge resource clusters in which edge nodes leased by the tenant on the cloud service platform are located, that the one or more edge resource clusters are the edge service application range of the tenant.

S402: The management node queries, based on the edge service application range specified by the tenant, an IP address of an execution node within the range.

Specifically, the management node queries an edge resource cluster management table, and queries the IP address of the execution node included in the edge resource cluster in which the edge nodes leased by the tenant are located within the edge service application range specified by the tenant. The edge resource cluster management table is stored in the management node, and the edge resource cluster management table includes but is not limited to the following content: edge resource cluster IDs, an IP address of an edge node in each edge resource cluster, an IP address of an execution node in each edge resource cluster, tenant IDs, and a correspondence between each tenant and an edge node leased by each tenant. A form of the edge resource cluster management table is not limited in this application. For example, the edge resource cluster management table may be a combination of one or more structured data tables, or may be a multi-level data table. For example, an edge service application range selected by the tenant A is Guangdong province, South China, the management node queries, based on this range, an ID or IDs of one or more edge resource clusters in which edge nodes corresponding to an ID of the tenant A in Guangdong province are located, and continues to query IP addresses of all execution nodes in the one or more edge resource clusters based on the ID or IDs of the one or more edge resource clusters, to obtain the found IP addresses of all execution nodes.

S403: The management node delivers the edge service policy to the execution node based on the found IP address of the execution node.

S404: The execution node receives the edge service policy, and monitors information about an edge node leased by the tenant, including fault information, load information, location information, specification information, and the like.

It should be noted that the edge service policy may be a load balancing policy. The execution node may monitor, according to received different load balancing policies, different information of the edge node of the tenant. However, the execution node usually needs to monitor the fault information and the location information of the edge node. The fault information indicates that the edge node is faulty, normal, or uncertain, and the location information indicates a geographical location in which the edge node is located and an IP address.

Optionally, when the execution node monitors a faulty edge node, the execution node may send the fault information to the alarm module, to enable the alarm module to send a fault alarm.

S405: The edge node returns the information about the edge node.

S406: The execution node creates a policy table based on the information about the edge node.

It should be understood that, in this application, each execution node monitors the information about the edge node leased by the tenant in the edge resource cluster in which the edge execution node is located. Optionally, data communication may be performed between execution nodes. For example, information about edge nodes monitored by execution nodes in different edge resource clusters is mutually transmitted between the execution nodes, and therefore, each execution node in an edge service application range obtains information about all edge nodes of the tenant in the edge service application range.

Execution nodes create a policy table, and execution nodes in a same edge resource cluster share the policy table. The policy table includes but is limited to the following content: an ID of an edge resource cluster, information about an edge node (fault information, load information, location information, specification information, and the like), an edge service policy corresponding to the edge node, and an ID of a tenant corresponding to the edge node. In an edge service application range, execution nodes in different edge resource clusters may periodically transmit, to each other, a policy table maintained by the execution nodes in the different edge resource clusters. By using the method, load balancing between edge nodes leased by a tenant in the edge service application range can be ensured, and by using the method, when a terminal requests an edge service, after the request of the terminal is sent to an execution node in an edge resource cluster in which an edge node that is not leased by the tenant is located, it can be ensured that the execution node may also forward, according to an edge service policy in the policy table, the edge service request sent by the terminal to a target edge node leased by the tenant in another edge resource cluster. In addition, the execution node can ensure load balancing between the edge nodes leased by the tenant.

S407: The execution node returns a policy delivery completion response to the management node.

S408: The management node updates a tenant management table.

The tenant management table records information such as a plurality of tenant IDs, an ID of an edge resource cluster in which an edge node leased by each tenant is located, an IP address of an execution node that is included in the edge resource cluster, and an edge service policy corresponding to each tenant. The tenant management table maintained by the management node includes the foregoing information corresponding to each tenant who leases a resource in the cloud computing system, and is used for unified management.

S409: The management node returns the policy delivery completion response to the tenant.

It should be noted that, after a procedure of the policy delivery phase, delivery of the edge service policy selected is completed. When a terminal starts to send an edge service request, the edge service request is forwarded by the operator device to an execution node. The edge service policy is executed by the execution node. The execution node determines a target edge node for the terminal, and implements load balancing of each edge node in an edge service application range, to provide an optimized edge service path for the terminal. In the edge service providing method provided in this application, the execution node is deployed in the edge resource cluster. In a process in which the execution node offloads the edge service request sent by the terminal to determine the target edge node and implement load balancing, a delay of obtaining an edge service response by the terminal can be reduced.

It should be noted that, in a case in which the edge service application range needs to be updated (for example, an edge node within an initial edge service application range is overloaded, or a large quantity of edge nodes in an area are faulty), it needs to execute the foregoing steps: The management node determines an execution node in a new edge service application range and delivers an edge service policy to the execution node, and the execution node obtains information about edge nodes. Therefore, in the new edge service application range, the execution node may determine, according to the edge service policy, a target edge node for a terminal and implement load balancing between the edge nodes.

Figure 7:
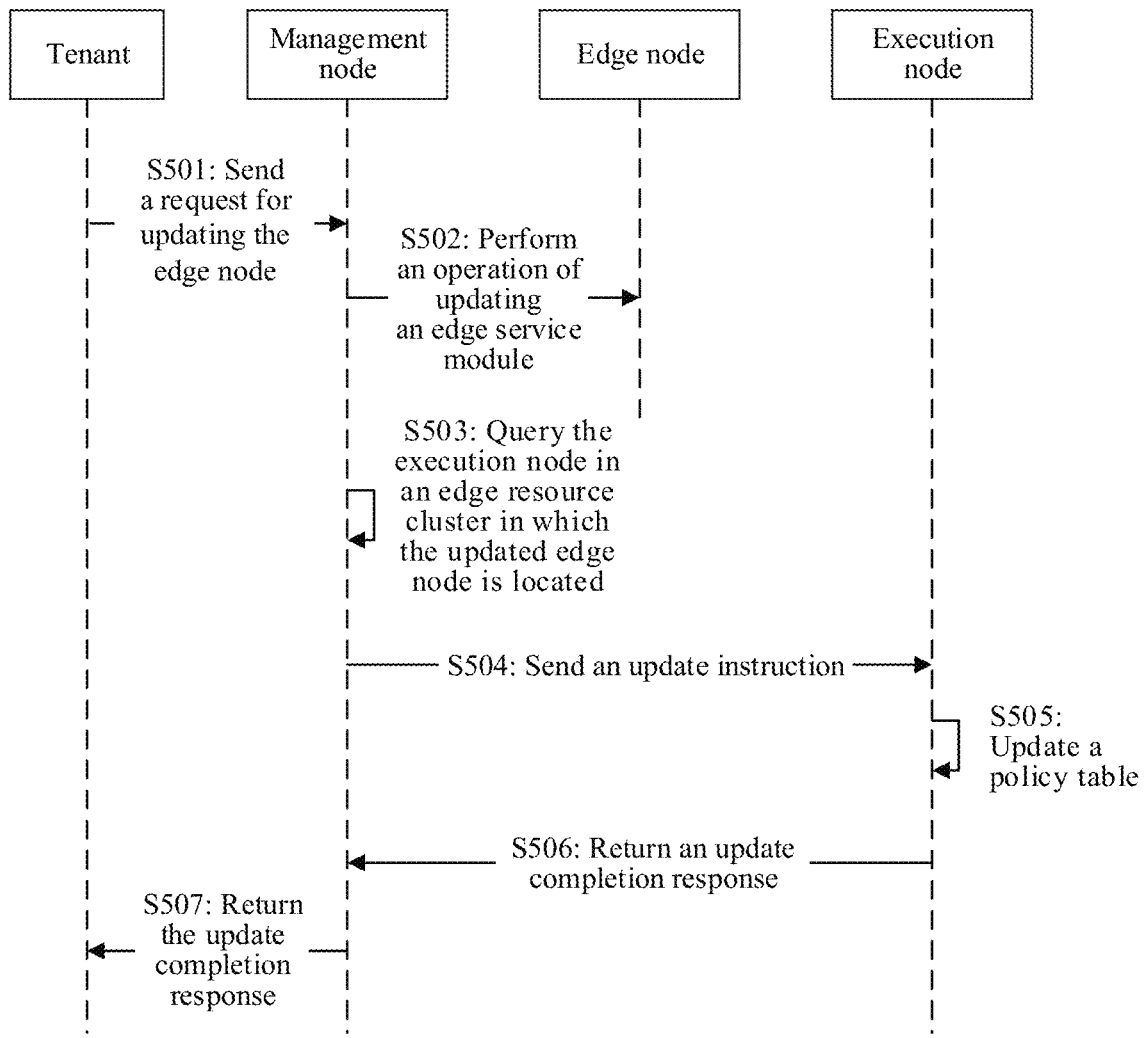
FIG. 7 is a schematic flowchart of edge node update according to an embodiment of this application.

After the policy delivery is completed, when the tenant updates, on the cloud service platform, an edge node that provides an edge service (for example, the tenant leases anew edge node, deletes a leased edge node, and modifies the specifications of the leased edge node), information about the edge node stored in the management node and the execution node also needs to be updated synchronously. As shown in FIG. 7, a specific update procedure is as follows:

S501: The tenant sends an edge node update request.

Specifically, the tenant sends the edge node update request by using the cloud service platform, and that the tenant updates the edge node includes: adding a new edge node; deleting the leased edge node; and modifying the specifications of the leased edge node.

S502: The management node receives the edge node update request of the tenant, and performs an edge node update operation.

Specifically, the management node performs the edge node update operation based on content of the edge node update request of the tenant. The edge node update request includes update information, and the update information includes any one or more of the following: information about adding the new edge node, information about deleting one or more leased edge nodes, and information about modifying the specifications of the one or more leased edge nodes. When the edge node update request of the tenant indicates to add the new edge node in an area, the management node deploys the new edge node for the tenant in an edge resource cluster in the area. When the edge node update request of the tenant indicates to delete an edge node of an area, the management node performs an operation of deleting the edge node of the area specified by the tenant. When the edge node update request of the tenant indicates to modify the specifications of an edge node in an area, the management node performs an operation of modifying the specifications of the edge node in the area specified by the tenant.

S503: The management node queries an edge resource cluster management table, and queries an IP address of an execution node in an edge resource cluster in which the updated edge node is located.

S504: The management node sends an update instruction to the execution node in the edge resource cluster in which the updated edge node is located.

Specifically, the update instruction sent by the management node carries update information, and the update instruction instructs the execution node to update the policy table based on the update information.

Optionally, the update instruction may further carry the edge service policy selected by the tenant.

S505: The execution node receives the update instruction, and updates the policy table.

Specifically, when the tenant adds the new edge node, the execution node adds, based on the update information, an IP address of the new edge node to an ID of an edge resource cluster in which the new edge node is located, and records information such as the specifications of the new edge node. When the tenant deletes a created edge node, the execution node deletes information about the deleted edge node from the policy table. When the tenant modifies the specifications of the created edge node, the execution node correspondingly modifies the specifications of the edge node recorded in the policy table.

S506: The execution node returns an update completion response to the management node.

S507: The management node returns the update completion response to the tenant.

Policy Execution Phase

Figure 8:
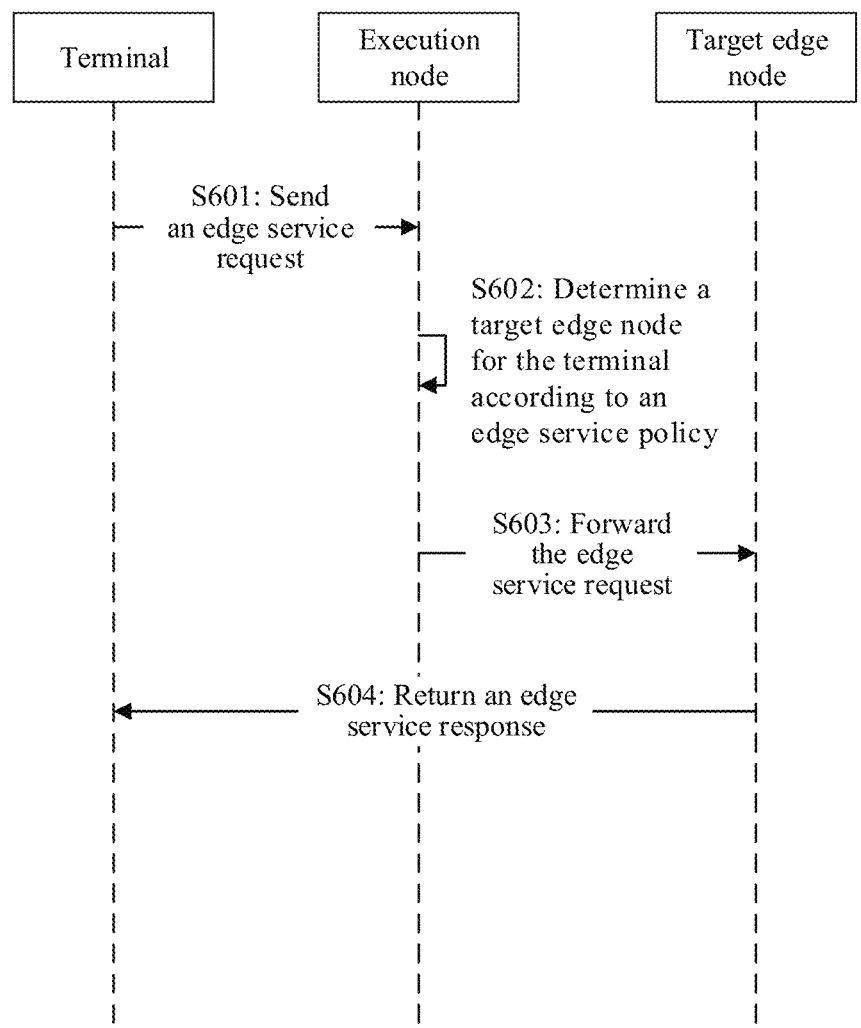
FIG. 8 is a schematic flowchart of policy execution according to an embodiment of this application.

After delivery of the edge service policy is completed, the tenant may release the edge service to the terminal for use (for example, if the tenant releases an edge cloud game application on the App Store, and a user downloads the cloud game application to the terminal, the user can use a cloud game service by using the terminal). When the terminal uses the edge service, the execution node executes the edge service policy to determine, for the terminal, a target edge node that provides the edge service. A specific procedure is shown in FIG. 8.

S601: The terminal sends an edge service request to the execution node.

Specifically, the terminal first sends the edge service request to the operator device, and the operator device routes the edge service request to the execution node based on routing information.

Optionally, in the pre-deployment phase, when the plurality of execution nodes in the edge resource cluster advertise the same anycast IP, and advertise the routing policy (for example, an equal-cost route, and a dynamic measurement selection) to the operator device, the terminal sends the edge service request to the operator device, and the operator device routes, according to the routing policy, the edge service request of the terminal to an optimal execution node under the routing policy.

Optionally, in the pre-deployment phase, when the IP address of the execution node in the edge resource cluster is registered with a hyper text transfer protocol (HTTP) domain name server (DNS), the edge service request sent by the terminal is first sent to the HTTP DNS. The HTTP DNS returns an IP address of a nearest execution node to the terminal based on a stored location database, and the edge service request of the terminal is sent to the execution node again.

S602: The execution node receives the edge service request, and determines the target edge node for a user of the terminal according to the edge service policy and based on the stored information about the edge node leased by the tenant in the edge resource cluster in which the execution node is located (or information about the edge node leased by the tenant within the edge service application range).

S603: The execution node forwards the edge service request of the terminal to the target edge node.

S604: The target edge node returns an edge service response to the terminal, and provides the edge service for the terminal.

It should be noted that, in the foregoing policy execution phase, when the edge service request sent by the terminal is routed to an execution node that is not within a load balancing policy application range configured by the tenant, the execution node returns a request failure response to the terminal, or prompts the terminal that the service resource cannot be found. For example, a tenant configures a load balancing policy in the South China for a website A. When a terminal in the Northeast wants to access the website, an edge service request is routed to an execution node of a Harbin site. Because the execution node is not within an application range of the load balancing policy, the execution node cannot query information about an edge service module of the website A, and therefore returns a request failure response.

It should be noted that, in the foregoing policy execution phase, after the edge service request sent by the terminal is routed to an execution node in an edge resource cluster in which an edge node leased by a tenant who does not release the edge service is located, the execution node queries whether the execution node stores a policy table corresponding to the tenant. If the policy table is stored, the execution node determines a target edge node for the terminal according to an edge service policy in the table and based on information about the edge node leased by the tenant, and forwards the edge service request to the target edge node. Alternatively, if the execution node does not store the policy table corresponding to the tenant, the execution node forwards, based on information carried in the edge service request (for example, an ID of the requested edge service, and an IP address of the terminal), the edge service request to an execution node in an edge resource cluster that is leased by the tenant and that can provide the edge service, and the execution node in the edge resource cluster that can provide the edge service determines, for the terminal according to the edge service policy, a target edge node that provides the edge service.

Optionally, after the foregoing step S604 is completed, the execution node may periodically monitor a status of the edge node that provides the edge service for the terminal (for example, the execution node periodically sends a detection packet to the edge node to determine whether a detection packet response is normal). If it is found that the edge node providing the edge service is faulty, the execution node performs failover for traffic sent by the terminal, and forwards the traffic sent by the terminal to another normal edge node, so that the terminal obtains the edge service with stable quality.

Figure 9:
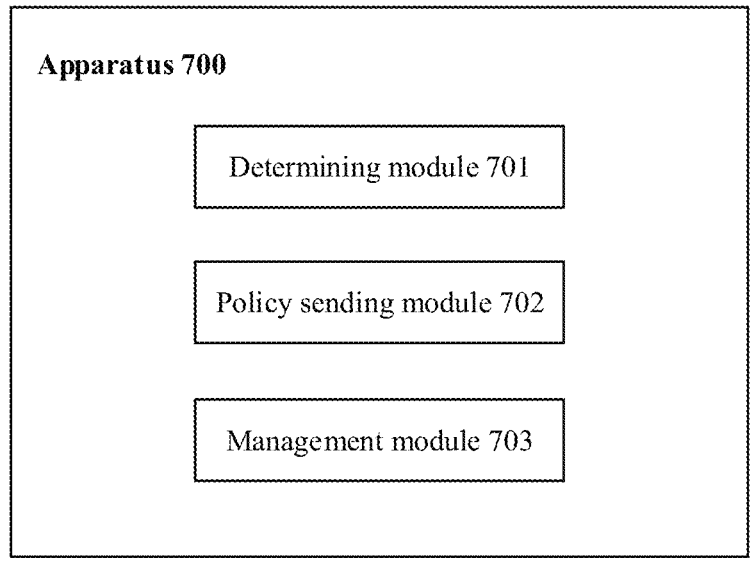
FIG. 9 is a schematic diagram of a structure of a management apparatus 700 according to an embodiment of this application.

As shown in FIG. 9, this application further provides an edge service providing apparatus 700. How to divide function units in the apparatus is not limited in this application. The following provides an example of division of function units.

The apparatus 700 includes: a determining module 701, a policy sending module 702, and a management module 703.

The determining module 701 is configured to determine a target execution node based on an edge service application range. The edge service application range includes a specified physical area, or a specified edge resource cluster, or a subset of a specified edge resource cluster. The determining module 701 is further configured to determine, based on information about a tenant, the edge service application range applicable to the tenant. The determining module 701 is further configured to receive a load balancing policy specified by the tenant; or the determining module 701 is further configured to determine, based on the information about the tenant, the load balancing policy applicable to the tenant.

Specifically, the determining module 701 is configured to query, based on the edge service application range, an edge resource cluster management table bound to the tenant, to obtain an IP address of the target execution node.

The policy sending module 702 is configured to send an edge service policy to the target execution node. The edge service policy is used by the target execution node to forward an edge service request from a terminal to a target edge node.

The management module 703 is configured to obtain status information of an execution node or an edge node within the edge service application range, and manage the execution node or the edge node within the edge service application range based on the status information.

The management module 703 is further configured to send an update instruction to the execution node based on update information of the edge node within the edge service application range.

The management module 703 is further configured to: send alarm information to an alarm module based on fault information of the execution node within the edge service application range, and determine, based on the fault information of the execution node within the edge service application range, a standby execution node corresponding to the faulty execution node.

The management module 703 is further configured to update the edge service application range. An updated edge service application range is an application range with a low priority or a relatively large application range.

Figure 10:
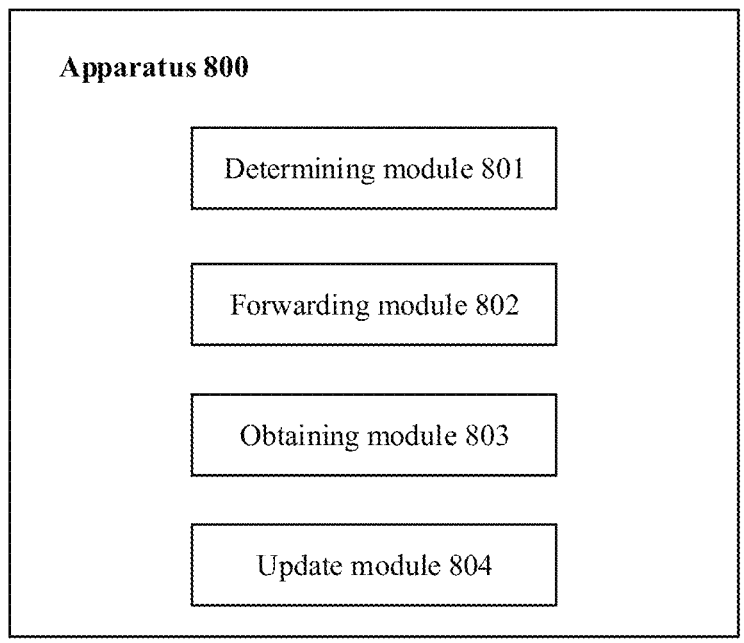
FIG. 10 is a schematic diagram of a structure of an execution apparatus 800 according to an embodiment of this application.

As shown in FIG. 10, this application further provides an edge service providing apparatus 800. How to divide function units in the apparatus is not limited in this application. The following provides an example of division of function units.

The apparatus 800 includes: a determining module 801, a forwarding module 802, an obtaining module 803, and an update module 804.

The determining module 801 is configured to receive an edge service policy sent by a management node, and is further configured to: receive an edge service request from a terminal, and determine, according to the edge service policy, a target edge node that provides an edge service for the terminal.

The determining module 801 is specifically configured to determine, according to the edge service policy and based on information about at least one edge node, the target edge node that provides the edge service for the terminal.

The forwarding module 802 is configured to forward the edge service request to the target edge node.

The obtaining module 803 is configured to obtain the information about the at least one edge node. The information about the at least one edge node includes fault information of the at least one edge node and location information of the at least one edge node. The obtaining module 803 is further configured to obtain the fault information of the at least one edge node, and is further configured to send alarm information to an alarm module based on the fault information of the at least one edge node.

The update module 804 is configured to receive an update instruction sent by the management node, where the update instruction includes update information of an edge node within an edge service application range; and the update module 804 is further configured to update the stored information about the at least one edge node according to the update instruction.

A person of ordinary skill in the art may be aware that, in combination with the examples described in the embodiments disclosed in this specification, modules and method steps may be implemented by electronic hardware, computer software, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the computer software is used to implement the embodiments, all or a part of the embodiments may be implemented in a form of a computer program product. The computer program product includes one or more computer instructions. When the computer program instructions are loaded and executed on a computer, all or some of the procedures or functions according to FIG. 5 to FIG. 10 of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

What is claimed is:

1. An edge service management method, wherein the method is applied to a cloud computing system including a central resource cluster and at least one edge resource cluster, the central resource cluster managing the at least one edge resource cluster, the method comprising:
   determining, by a management node deployed in the central resource cluster, a target execution node based on an edge service application range corresponding to a service provided by a tenant, wherein the edge service application range comprises a specified physical area corresponding to a geographical coverage of edge nodes deployed in the at least one edge resource cluster and configured to provide the service of the tenant to a terminal, wherein the target execution node is deployed in one of the at least one edge resource cluster, and wherein the target execution node manages one or more edge nodes comprised in the at least one edge resource cluster, wherein the determining, by the management node, the target execution node comprises:
      querying, by the management node based on the edge service application range, an edge resource cluster management table stored in the management node, to obtain an Internet protocol (IP) address of the target execution node, wherein the edge resource cluster management table stores an identifier of the at least one edge resource cluster, an IP address of an execution node in the at least one edge resource cluster, and a correspondence between each tenant and edge nodes leased by each tenant; and
   sending, by the management node, an edge service policy to the target execution node based on the IP address, wherein the edge service policy is used by the target execution node to forward an edge service request from the terminal to a target edge node deployed in one of the at least one edge resource cluster, wherein the target edge node is one of the edge nodes deployed in the at least one edge resource cluster.

2. The method according to claim 1, further comprising:
   receiving, by the management node, the edge service application range specified by the tenant; or
   determining, by the management node based on information about the tenant, the edge service application range applicable to the tenant, wherein the information about the tenant comprises geographical locations or identifications associated with the edge nodes deployed in the at least one edge resource cluster and configured to provide the service provided by the tenant to the terminal.

3. The method according to claim 1, wherein the edge service policy comprises a load balancing policy, and the load balancing policy is used by the target execution node to select the target edge node, and is used to implement load balancing of one or more edge nodes within the edge service application range.

4. The method according to claim 3, further comprising:
receiving, by the management node, the load balancing policy specified by the tenant; or
determining, by the management node based on information about the tenant, the load balancing policy, wherein the information about the tenant comprises geographical locations or identifications associated with the edges nodes deployed in the at least one edge resource cluster and configured to provide the service provided by the tenant to the terminal.

5. The method according to claim 1,
wherein the edge service application range comprises a plurality of application ranges; and
wherein the management node selects an application range with a highest priority or a smallest application range as an initial edge service application range, wherein the smallest application range corresponds to a minimal geographical coverage.

6. The method according to claim 1, further comprising:
obtaining, by the management node, status information of an execution node or the edge node within the edge service application range, and managing the execution node or the edge node within the edge service application range based on the status information.

7. The method according to claim 6, wherein the status information comprises update information of the edge node within the edge service application range, the method further comprising:
sending, by the management node, an update instruction to the execution node based on the update information of the edge node within the edge service application range.

8. The method according to claim 7, further comprising:
updating, by the management node, the edge service application range to determine updated edge service application range, wherein the updated edge service application range is an application range with a low priority or a larger application range than the edge service application range in geographical coverage.

9. The method according to claim 6, wherein the status information comprises fault information of the execution node within the edge service application range, the method further comprising:
sending, by the management node, alarm information based on the fault information of the execution node within the edge service application range; and
determining, by the management node based on the fault information of the execution node within the edge service application range, a standby execution node corresponding to the faulty execution node.

10. An edge service providing method, wherein the method is applied to a cloud computing system including a central resource cluster and at least one edge resource cluster, the central resource cluster managing the at least one edge resource cluster, the method comprising:
receiving, by an execution node deployed in one of the at least one edge resource cluster, an edge service policy received from a management node deployed in the central resource cluster, wherein the execution node manages one or more edge nodes comprised in the at least one edge resource cluster based on an edge service application range corresponding to a service provided by a tenant, wherein the edge service application range comprises a specified physical area corresponding to a geographical coverage of edge nodes deployed in the at least one edge resource cluster and configured to provide the service of the tenant to a terminal, and wherein the edge service policy is received from the management node based an Internet Protocol (IP) address of the execution node obtained from an edge resource cluster management table stored in the management node that stores an identifier of the at least one edge resource cluster, an IP address of an execution node in the at least one edge resource cluster, and a correspondence between each tenant and edge nodes leased by each tenant;
receiving, by the execution node, an edge service request from the terminal;
determining, by the execution node according to the edge service policy, a target edge node that provides the service for the terminal, wherein the target edge node is deployed in one of the at least one edge resource cluster, and wherein the target edge node is one of the edge nodes deployed in the at least one edge resource cluster; and
forwarding, by the execution node, the edge service request to the target edge node.

11. The method according to claim 10, wherein the edge service policy comprises a load balancing policy, and the load balancing policy is used by the execution node to select the target edge node, and is used to implement load balancing of one or more edge nodes within the edge service application range.

12. The method according to claim 10, further comprising:
obtaining, by the execution node, information about the one or more edge nodes managed by the execution node; and
wherein the determining, by the execution node according to the edge service policy, the target edge node comprises:
determining, by the execution node according to the edge service policy and based on the information about the one or more edge nodes, the target edge node that provides the edge service for the terminal.

13. The method according to claim 12, wherein the information about the one or more edge nodes comprises fault information of the one or more edge nodes and location information of the one or more edge nodes.

14. The method according to claim 10, further comprising:
receiving, by the execution node, an update instruction received from the management node, wherein the update instruction comprises update information of one or more edge nodes within the edge service application range; and
updating, by the execution node, the information about the one or more edge nodes according to the update instruction.

15. A computing device in a cloud computing system including a central resource cluster and at least one edge resource cluster, the central resource cluster managing the at least one edge resource cluster, comprising:
a memory configured to store computer instructions; and
a processor configured to execute the computer instructions stored in the memory to cause the computing device to perform:
determining a target execution node based on an edge service application range corresponding to a service provided by a tenant, wherein the edge service application range comprises a specified physical area corresponding to a geographical coverage of edge nodes deployed in the at least one edge resource cluster and configured to provide the service of the tenant to a terminal, wherein the target execution node is deployed in one of the at least one edge resource cluster, and wherein the target execution node manages one or more edge nodes comprised in the at least one edge resource cluster, wherein the determining the target execution node comprises:

querying, by the management node based on the edge service application range, an edge resource cluster management table stored in the management node, to obtain an Internet protocol (IP) address of the target execution node, wherein the edge resource cluster management table stores an identifier of the at least one edge resource cluster, an IP address of an execution node in the at least one edge resource cluster, and a correspondence between each tenant and edge nodes leased by each tenant; and sending, based on the IP address, an edge service policy to the target execution node deployed in one of at least one edge resource cluster, wherein the edge service policy is used by the target execution node to forward an edge service request from the terminal to a target edge node deployed in one of at least one edge resource cluster, wherein the target edge node is one of the edge nodes deployed in the at least one edge resource cluster.

16. The computing device according to claim 15, wherein the processor executing the computer instructions further causes computing device to perform:

receiving the edge service application range specified by the tenant; or determining, based on information about the tenant, the edge service application range applicable to the tenant, wherein the information about the tenant comprises geographical locations or identifications associated with the edge nodes deployed in the at least one edge resource cluster and configured to provide the service provided by the tenant to the terminal.

17. The computing device according to claim 15, wherein the edge service policy comprises a load balancing policy, and the load balancing policy is used by the target execution node to select the target edge node, and is used to implement load balancing of one or more edge nodes within the edge service application range.

18. The computing device according to claim 15, wherein the processor executing the computer instructions further causes computing device to perform:

receiving the load balancing policy specified by the tenant; or determining, based on information about the tenant, the load balancing policy, wherein the information about the tenant comprises geographical locations or identifications associated with the edges nodes deployed in the at least one edge resource cluster and configured to provide the service provided by the tenant to the terminal.

\* \* \* \* \*